Patented July 7, 1931

1,813,531

UNITED STATES PATENT OFFICE

HENRI DU BOISTESSELIN, OF ROUEN, FRANCE, ASSIGNOR OF ONE-HALF TO MAURICE HUREL, OF AUNAY S/CRECY, EURE & LOIR, FRANCE

PROCESS FOR OBTAINING A PRODUCT RICH IN CELLULOSE AND USEFUL BY-PRODUCTS FROM STRAW

No Drawing. Application filed September 13, 1929, Serial No. 392,497, and in France September 18, 1928.

My invention relates to a process for treating straws with a view to extracting, first, a product rich in cellulose, and, second, useful by-products resulting from the transformation of the non-cellulosic compounds.

The process consists in causing nitric acid having a weak concentration and a relatively low temperature to act on straw.

It is known that nitric acid having from 5 to 10% $HNO_3$, acting at a temperature from 60 to 80° C., has a specific action on the lignin group which it converts entirely into soluble derivitives. This characteristic reaction has been studies with particular attention to the ligno-cellulose group of hard woods (Baly and Charley—Ber. 1895, p. 922).

Straw offers simultaneously the character of a ligno-cellulose and a pecto-cellulose and I have discovered that straw can be treated with diluted nitric acid for the purpose of extracting the cellulose which it contains.

I employ normal nitric acid at a temperature from 80 to 85° C. and prolong the heating operation for three hours, the quantity of normal acid placed with the straw being such that at the end of the heating operation the acid will not titrate less than half normal value.

I have discovered that the products solubilized during the treatment of the straw do not cause the working conditions to vary and that the acid having served for a first treatment can be brought back to its original normal titration, by adding concentrated nitric acid, and utilized anew for a second treatment, the used acid of the second treatment being again brought back to its normal titration and used for a third operation and so on with increasing of the bath between each operation.

The result of this manner of proceeding is to reduce the consumption of nitric acid, utilize the calories contained in the residual juices and to concentrate the solubilized products by the heating operation, in order to facilitate recovery.

It has also been discovered that the straw may eventually be placed in the presence of the cooking acid without having been passed through a straw grinder and without having crushed the nodes thereof.

After elimination of the juices from cooking, the cooked straw is methodically washed as will be explained later on.

The cooked straw, which has substantially retained the appearance of the original straw, is eventually reduced to sheet form. Said sheets, dried or not, are subsequently united into bales. The said sheets or the cooked straw, unpressed, are defiberized by slow boiling, first in an alkaline or weak alkaline carbonated solution and then in water until a raw paste is obtained. The raw paste is subsequently bleached by any of the well known processes suitable for bleaching cellulose pastes.

The juices from the defibering operation when neutralized with an acid, cause precipitation of a flaky yellow-brown compound which assembles in granular form upon boiling. Said compound, of a phenolic nature, finds use in the leather industry.

Under the action of diluted hot nitric acid, the lignin constituents are furnished as follows:

First, the nitrosized compounds, which by decomposition furnish bibasic acids and chiefly oxalic acid;

Second, the hydroxylized products which are volatile, such as acetic and formic acid.

The pentosanes of the straw have been hydroxylized into pentose which partially have been oxidized into bibasic acids.

In the residual juices of the heating operation, there exist, as principal products, acetic acid, formic acid, oxalic acid, pentose and the nitric acid not utilized. The separation of these products can be brought about in a manner which will now be described.

I add to the residual juices a catalyzer such as iron sulphate, or mercury nitrate with a view to utilizing the nitric acid still contained in the juices for completing the oxidization of the nitrated and nitrosized bodies and for oxidizing the pentose with a view to forming a new quantity of oxalic acid which is added to that produced during the successive heating operations.

The juices are maintained at a temperature from 65 to 85° C. until destruction of the nitric acid, while the volatile acids, constituted principally by acetic acid, distil and are condensed by eventually operating under reduced pressure. The residue of the distillation is a sirupy liquid of a brown-red color which is subjected to dialysis, through sheets of viscose, for example. The exosmotic juices give oxalic acid crystals by concentrating. The endosmotic juices give an agglutinous mass when concentrated, composed principally of pentose, and utilizable for the agglomeration of pulverulent materials, and chiefly coal dust.

The way in which the various operations, above enumerated, are carried out will now be described.

The straw ground or not, is introduced into receptacles of a nature which will resist the action of acids. Normal nitric acid is introduced hot onto the straw and the temperature of the whole is maintained by any suitable heating means between 80 and 85° C. during the duration of the cooking operation which lasts three hours.

100 kilograms of straw require a minimum of 900 liters of normal acid. After cooking, the residual juices are evacuated. The quantity of juice retained by the cooked straw is about 300 liters. The cooked straw is sprinkled with 300 liters of hot water at about 70° C. After about 10 minutes contact the water is evacuated. This water of the first washing is united with the residual juice and after the adjunction of nitric acid to bring the whole back to normal titration, the same serves for the treatment of a new quantity of 100 kilograms of straw. For recharging, there is required about 17 kilograms of nitric acid at 36° Bé. The cooked straw is again placed in contact with 300 liters of hot water for about 10 minutes. This water of the second washing serves for the first washing of the cooked straw of the following operation. A third washing takes place under the same conditions and the water of the third washing serves for the washing of the following operation. There are thus five successive washings made and always hot.

The cooked straw is washed, is extracted from the cooking apparatus and arranged in sheets of about 1 centimeter in thickness, by means of any suitable sort of press or carried directly to the defibering operation. The sheets can, if desired, be dried, either in free air, or in a drier under the action of a stream of hot air.

100 kilograms of straw having 10% water furnish 60 kilograms of sheets having 10% water.

The sheets, wet or dry, are preferably united into bales of about 50 kilograms each if they are to be shipped.

The sheets become defiberized in the same way as unpressed cooked straw, by slow boiling in a diluted solution of carbonate of soda or caustic soda. For example, the sheets dry may be coiled for 30 minutes in a solution of carbonate of soda solution of 5%. 100 kilograms of sheets dry require 2,000 liters of the solution.

The alkaline solution, which colors strongly, and replaced by boiling water for 15 minutes after which the same operation is repeated two times in order to obtain uncolored washing water. The raw paste obtained is bleached easily in the usual manner with 2% chlorine in weight of sheets. The output in bleached paste dry is 70% of the weight of sheets which is dependent upon an output of bleached dry paste of 37.8% of the straw containing 10% water.

The juices from the defibering operation are neutralized boiling by an acid such as sulphuric acid. The granular precipitate is filtered, washed until an absence of acidity and gives, after drying and grinding, a brownish yellow powder with an output of 7% of the weight of the dried sheets which finds suitable use in the leather industry.

Experiment has proved that it would be useful to treat the residual juices of the cooking operation after 10 successive cooking operations. The juices evacuated from the tenth cooking operation and the waters from the first washing which may be about 900 liters, have added thereto from 2 to 300 grams of iron sulfate and are maintained about 5 hours between about 65 and 85° C., operating eventually under reduced pressure. There is first distilled water and acetic acid. The nitric acid concentrates in the juices and it is necessary to watch that a concentration more than 5 times normal concentration of nitric acid is not exceeded which is maintained by introducing water into the juices being distilled.

At the end of about 5 hours the distillation is forced until about 150 liters of a sirupy reddish brown liquid are obtained, which is subjected to dialysis. The juices of exosmosis, about 500 liters, are concentrated and give by crystallization about 50 kilograms of oxalic acid. The juices of endosmosis, about 600 liters, are concentrated up to 30 to 32° Bé. I thus obtain 150 liters of a liquid having high adhesive properties.

The acetic vapors given off during distillation may be condensed, but are preferably received in an alkaline solution such as soda, carbonate of soda or whitewash with a view to forming acetate of soda or acetate of lime. The solutions of acetate of soda concentrated and caused to crystallize furnish about 150 kilograms of crystallized acetate of soda.

Having described my invention what I claim as new and desire to secure by Letters Patent is:

1. A process for preparing a product rich in cellulose from straw which comprises treating the straw at a temperature greater than 80° C. with substantially normal nitric acid in quantities such that the content does not fall below half normal value and subsequently draining, washing and drying the straw.

2. A process for preparing a product rich in cellulose from straw which comprises treating the straw at a temperature between 80 and 85° C. with substantially normal nitric acid in quantities such that the content does not fall below half normal value and subsequently draining, washing and drying the straw.

3. A process for preparing a product rich in cellulose from straw which comprises treating raw straw in unground, uncrushed state at a temperature greater than 80° C. with substantially normal nitric acid in quantities such that the content does not fall below half normal value and subsequently draining, washing and drying the straw.

4. A process for preparing a product rich in cellulose from straw which comprises treating raw straw in unground, uncrushed state at a temperature between 80 and 85° C. with substantially normal nitric acid in quantities such that the content does not fall below half normal value and subsequently draining, washing and drying the straw.

5. In a process for preparing a product rich in cellulose from straw treated with nitric acid successively and heated, the step which consists in increasing the acidity of cooking baths by adding fresh nitric acid for reducing the acid consumption, utilizing the heat contained in the juices and concentrating the products resulting from the heating operation.

6. A process for preparing a product rich in cellulose from straw which comprises treating the straw at a temperature greater than 80° C. with substantially normal nitric acid in quantities such that the content does not fall below half normal value, draining, washing and drying the straw, and defiberizing the product thus obtained by slow boiling in a weak alkaline solution for producing a cellulose of straw which is easily bleached.

7. A process for preparing a product rich in cellulose from straw which comprises treating the straw at a temperature greater than 80° C. with substantially normal nitric acid in quantities such that the content does not fall below half normal value, draining washing and drying the straw, defiberizing the product thus obtained by slow boiling in a weak alkaline solution for producing a cellulose of straw which is easily bleached and neutralizing the juices from the defiberizing operation for recovering a product of a phenolic nature suitable for industrial use.

8. As a new industrial product the raw substance obtained by the process set forth in claim 1 in sheet form.

9. As a new industrial product the raw substance obtained by the process set forth in claim 1 in compressed sheet form.

In testimony whereof I hereunto affix my signature.

HENRI du BOISTESSELIN.